May 7, 1957  B. R. BETTER ET AL  2,791,304
SAFE TORQUE DRIVER
Filed Feb. 5, 1954  4 Sheets-Sheet 1
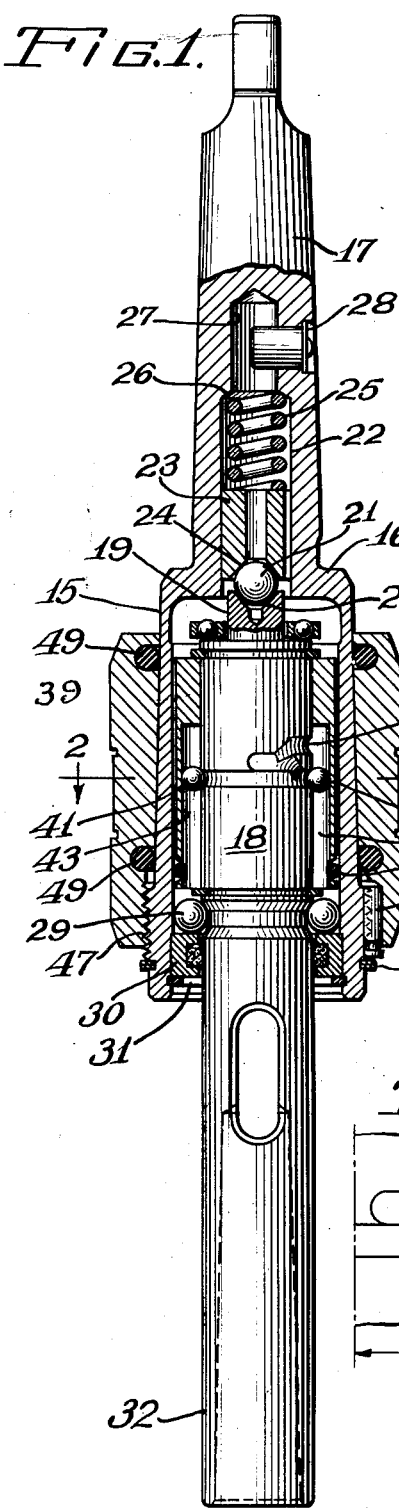
Inventors:
Bernard R. Better
John W. Lehde, Jr.
By Glenn S. Noble Atty.

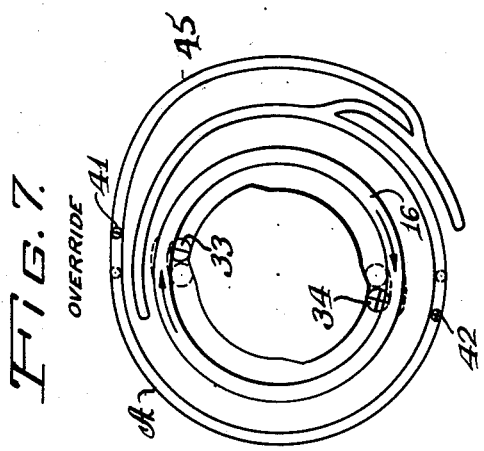
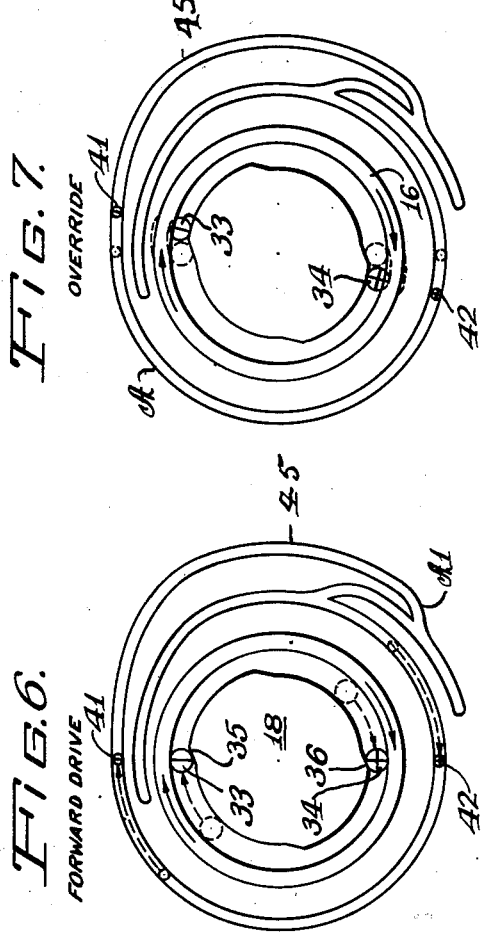
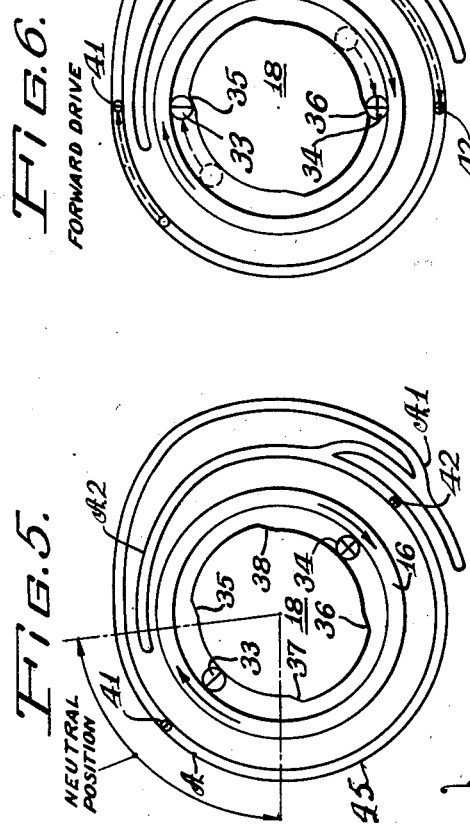
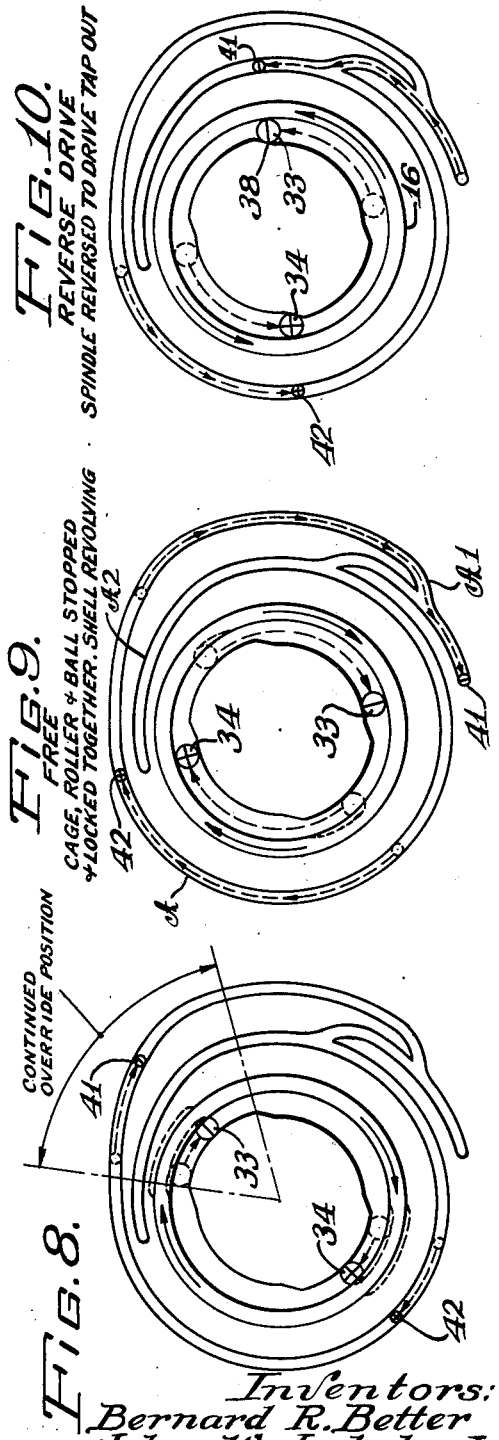

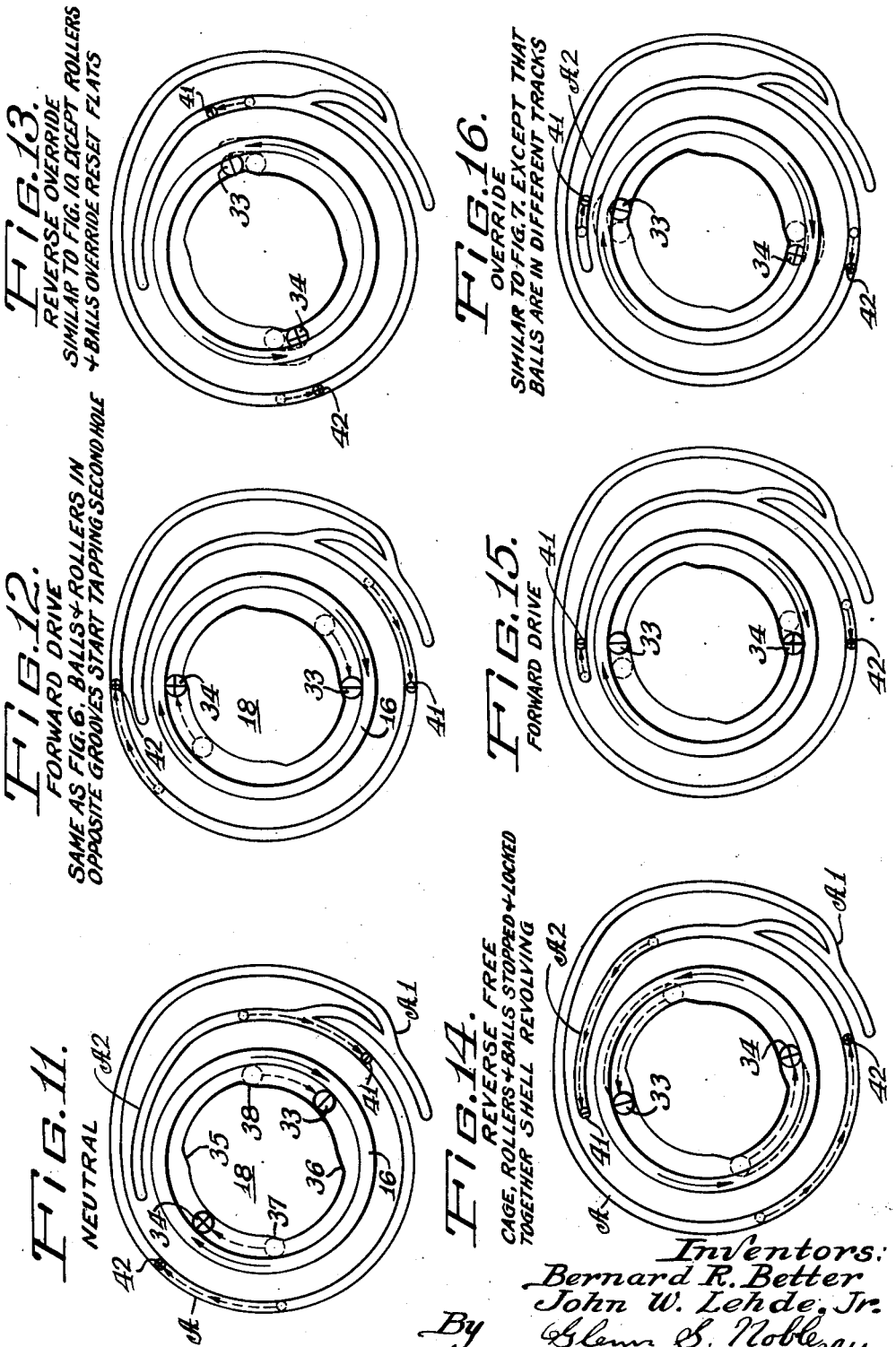

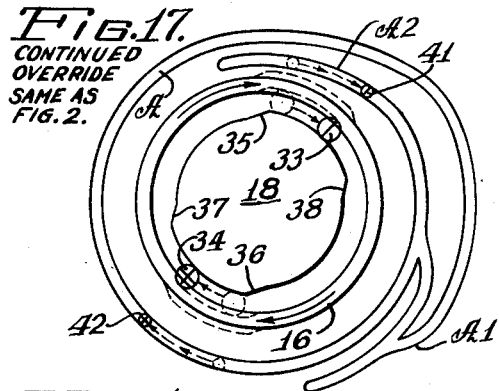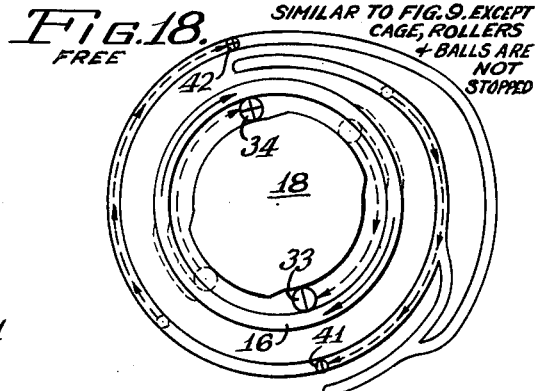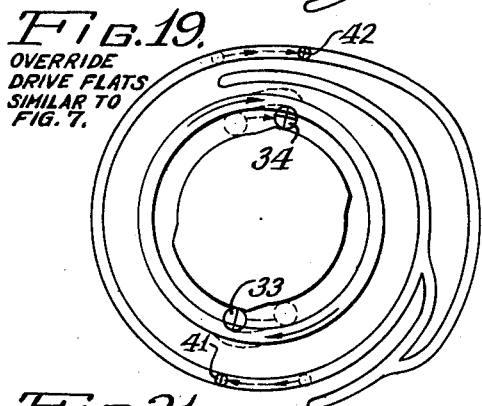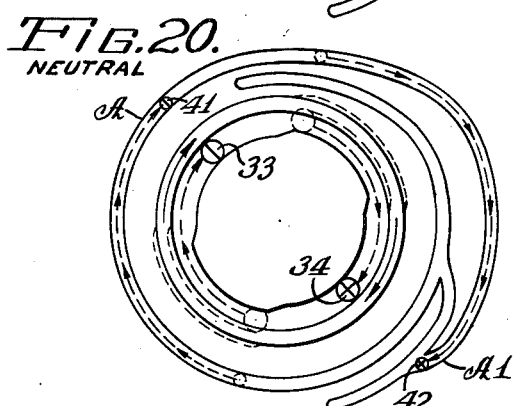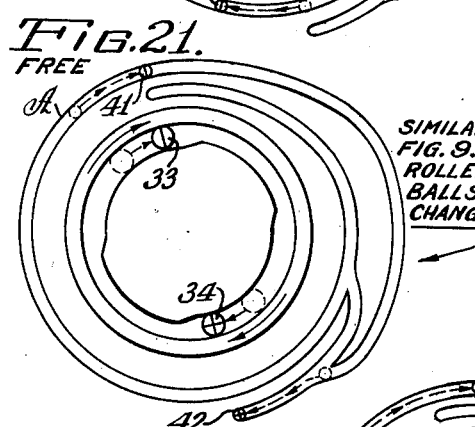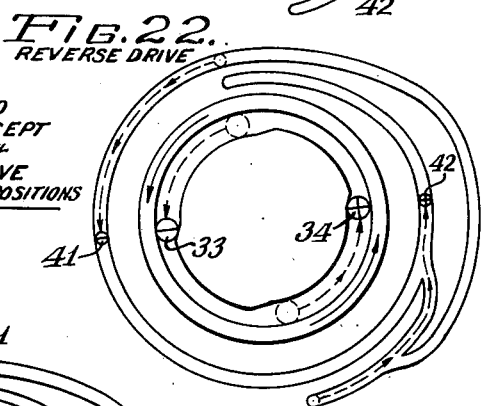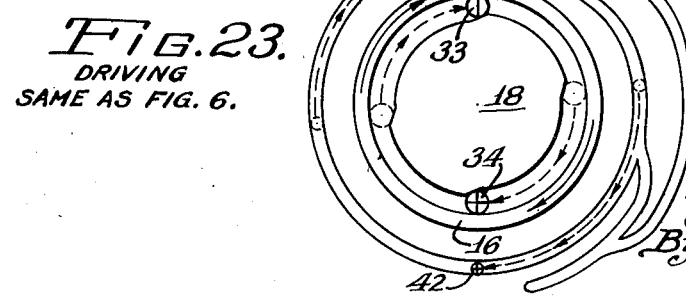

United States Patent Office 2,791,304
Patented May 7, 1957

2,791,304

SAFE TORQUE DRIVER

Bernard R. Better and John W. Lehde, Jr., Chicago, Ill., assignors to Scully-Jones and Company, Chicago, Ill., a corporation of Illinois Application February 5, 1954, Serial No. 408,410

8 Claims. (Cl. 192—56)

This invention is intended for driving various tools or for other purposes as will be understood from the description, but is particularly adapted for use in driving and removing taps in tapping operations and will be particularly described in this connection. It embodies novel means for stopping the turning action on the tool when the strain reaches a predetermined or excessive amount and fully releasing the torque or twist on the tap until the tap is withdrawn, and also includes protective means for preventing breakage of the taps under various or unusual conditions incident to the tapping operations, and in this sense is in the nature of a super safety driver, and in actual operation has shown that it serves to protect the taps and as a consequence, large numbers of operations may be performed without any breakage.

It includes a driving member comprising an elastic shell which is adapted to be expanded or deformed transversely for relieving the driving torque, the shell acting through rollers to drive a driven member which is provided with means for attachment to the tap or other tool. The driven member is provided with driving cams which coact with the rollers but the rollers are able to leave the driving cams completely when the torque becomes excessive, by passing over high or raised portions of the cams and simultaneously deforming or distorting the elastic shell. The rollers are held in predetermined circumferential positions by means of a cage and we provide novel means for holding the cage in various positions with respect to the driven member as may be necessary in order to perform certain operations which will be further described.

In general, the objects of the invention are to provide a novel safe torque driving mechanism which is adapted for actuating taps or other similar devices with little or no breakage of such tools.

Other objects and advantages will appear more fully from the following description taken in connection with the accompanying drawings, in which Fig. 1 is a longitudinal sectional view with parts broken away for convenience in illustration.

Fig. 2 is a cross section taken substantially on the line 2—2 of Fig. 1.

Fig. 3 is a sectional view taken on the line 3—3 of Fig. 2.

Fig. 4 is a view of certain grooves or tracks in the driven member as projected on to a plane or flat surface.

Figs. 5–23 are diagrammatic views illustrating the operation of the driver, these views including projections of the grooves in the driven member as though projected in planes at right angles to the driven member and illustrate the positioning of the balls which coact with the cage to hold the driven member in various positions with respect to the cage and also show the positions of the balls with respect to the driving rollers during different moments of the devices.

As shown in these drawings 15 is an integral cup-shaped or cylindrical driving member formed of resilient metal so that it is adapted to expand and contract or be distorted during the operation of the driver. One end of this driving member is closed as shown at 16 and is provided with a tang 17 or any other suitable means for connection with the machine tool or drill press to be used for actuating the same.

A cylindrical driven member 18 is rotatably and slidably mounted in the driving member as shown particularly in Fig. 1, the driven member has a projection 19 at one end with a conical recess 20 for receiving a supporting ball 21. The tang or shank 17 has a cylindrical bore 22 in which is mounted a plunger 23 having a conical recess 24 for receiving the ball 21. The plunger engages with a spring 25, the opposite end of which rests against a shoulder 26 in the bore 22. A short continuation 27 of the bore is supplied with lubricant by means of an oiler 28. The opposite end of the driven member is mounted in a ball bearing 29. The bearing and adjacent parts are held in position by means of a sealing ring 30 and retaining ring 31. The driven member extends outwardly from the driving member and is provided at its outer end 32 with a socket or other means for attachment to the tap or tool to be driven.

The driven member is driven by means of rollers 33 and 34 which are positioned between the inner surface of the cylindrical driving member and the driven member. While we have shown two of such driving rollers, it will be noted that any desired number may be utilized and the driven member is fashioned accordingly. The driven member has two oppositely disposed flats or cams 35 and 36 which are substantially parallel and which provide the driving cam surfaces for the two rollers, this arrangement being similar to an ordinary roller or ball clutch.

The driven member also has two oppositely disposed driving flats or surfaces 37 and 38 which serve as reversed drive flats for removing or reversing the taps.

The rollers are confined in a predetermined relation to each other by a cage 39 which is positioned between the driving member and the driven member as shown in Fig. 2. This cage may be held in any suitable manner as by means of a lock ring 40. Stop balls 41 and 42 are mounted in longitudinal grooves 43 and 44 along the inner surface of the cage and coact with a series of tracks 45 in the outer surface of the driven member. The purpose of the stop balls and their operation in connection with the shape of the tracks will be described more fully hereinafter.

In our improved driver, the distortion of the shell or driving member at the time the rollers override the humps in the cams is a measure of the greatest torque obtainable. In order to increase the torque, we provide an outer shell or cylinder 46 which fits over the driving member as shown in Figs. 1 and 3 and its inner bore is tapered as shown in order to fit the tapered surface of the driving member. The shell is threaded at its larger end with threads 47 which engage with threads 48 on the driving member. This threaded engagement provides for means for adjusting the shell longitudinally to draw it into closer fit with the driving member. Resilient packing rings 49 are provided for keeping out dirt or the like. The shell 46 may be held in adjusted position by means of a pin 50 which may be held by a locking ring 51.

The track 45 is of a circuitous nature and is shown as a longitudinal projection in Fig. 4. It is also shown in projected planes arranged at right angles to the driven member in order to illustrate the positioning of the rollers and balls in different positions of the cage during operation of the driver. Fig. 5 indicates the position of the rollers 33 and 34 when the driver is in free or rest position ready for operation. The ball 41 at this time is in the branch A of the track 45 and is free to go along with the roller 33. The ball 42 is also in this branch of the track as shown and is free to go along with the roller 34.

As the driving member rotates in the direction shown by the arrow, the rollers arrive at the driving flats 35 and 36 as shown in Fig. 6, and serve to drive the tap until it completes its stroke or until there has been some excessive resistance. When this occurs, the rollers override the high points of the driving flats as shown in Fig. 7 and simultaneously distort the driving shell as indicated but are then free to move with rolling friction around the driving member so that it is no longer actuated. This continues until the rollers reach the position shown in Fig. 9 where the adjacent surface of the driven member is spaced sufficiently from the driving member so that there is no force exerted on the rollers. As shown in Fig. 9, the cage, rollers and balls are stopped and locked together, but the shell or driving member may continue to revolve, without noise or any substantial friction.

The locking of these parts together is effected by the ball 42 which engages with the forward end of the groove A1 which is a continuation or branch of the groove A.

In order to withdraw the tap, the spindle of the machine is reversed which reverses the movement of the driving member 16 as shown in Fig. 10. At this time the roller 33 moves around the driven member until it engages with the reverse driving flat 38 which actuates the driven member 18 and withdraws the tap from the workpiece. At this time, the ball 42 passes back through the groove portion A' into the groove A as shown in Fig. 10. It will be noted that the action of the driving roller 34 is substantially the same as that of the roller 33.

The function of the balls 41 and 42 which coact with the groove means 45 to lock the cage 39 to the driven shaft during certain phases of the operation of the device is to provide a lock-out means so that when the rollers 33, 34 release due to overload, they will remain in released position regardless of the continuous rotation of the driving shaft until the device is recycled which requires reversal of rotation of the driving shaft.

For the next tapping operation, the spindle is again reversed and the driving member is rotated in the direction shown in Fig. 11 and the driving rollers move into the positions shown in Fig. 12 at which time the tap is again driven, the only difference from the positioning shown in Fig. 5 being that the rollers 33 and 34 have taken reverse positions for the continued driving of the driven member. Then after the tapping has been finished, the reverse to withdraw the tap is the same as previously described.

In the event of unusual resistance to the tap or excess strain being put on the tap in the reverse movement, the driving rollers will pass up over the high points of the driving cams with the consequent distortion of the driven member and will arrive at the positions shown in Fig. 13 during which the rollers merely roll with rolling friction around to the releasing position as shown in Fig. 14, which is the same position as shown in Fig. 9 except that the position of the driving rollers are reversed. At this time, the ball 41 stops at the end of the groove A² and again locks the cage with respect to the driven member. The driving member is now free to rotate in reverse until the operator either takes out the tap or again runs it forward as above described. This automatic resetting is accomplished by again reversing the movement of the driven member which then causes the operation as shown in Figs. 21, 22 and 23, the latter figure being the same as shown in Fig. 6.

A slight clearance is preferably left between the cage 39 and the inner wall of the driving member in order to accommodate the expansion and contraction of such member. In order to insure the movement of the cage and the rollers therein to move the rollers out of the fully released position, we provide a resilient ring 52 preferably of the O type which is mounted in a groove at one end of the cage and makes contact with the adjacent wall of the driving member and furnishes sufficient friction to cause the desired movement of the cage.

The action of the driving rollers in passing from driving positions to complete release positions provides means for fully releasing the driving member at predetermined torque settings. Furthermore, the movement of the rollers into non-driving positions permits continued free rotation of the driving member at any speed for an indefinite period of time without excessive heat due to friction of sliding surfaces or objectionable wear from rapid engagement and disengagement of cam surfaces. The arrangement also provides mechanical means for keeping the driven element in a no-load stop position until the driving member is reversed. The arrangement of the reverse driving flats or cams which coact with the rollers is such that the safety provisions are provided for withdrawing the taps as well as for driving the same. This arrangement permits full depth blind hole tapping at maximum speeds by its instant release and on account of the built-in cushioned stop for axial movement of the tool or tap. This results in minimized tool or tap breakage which may be caused by excessive torques from dull tools, chips, interference, hard spots or other operational hazards and prevents scrap parts or undesirable re-work. Our driver is such that less skill is required for the operator and the driver is capable of performing numerous operations without failure.

We claim:

1. A torque driver for driving taps or other tools having a unitary resilient driving cylinder, a cylindrical driven member in the cylinder having a longitudinal driving face and a roller releasing area spaced from the said driving face, rollers positioned between the driving cylinder and the driven member adapted to drive the driven member when engaging with the driving faces and to release the driven member under predetermined torque and become free when in the releasing areas, a cage for the rollers mounted between the driving cylinder and the driven member, and ball and groove means for holding the cage in predetermined circumferential positions with respect to the driven member.

2. A torque driver as per claim 1 in which the roller cage is provided with a longitudinal groove, a ball mounted in said groove and a circumferential tortuous groove track in the outer surface of the driven member which coacts with the ball to hold the cage in predetermined positions with respect to the driven member.

3. In a torque driver, the combination of a cylindrical driving member formed of a single piece of resilient metal, a driven member rotatably mounted in the driving member and having oppositely disposed longitudinal driving flats, rollers between the driving member and the driven member which coact with said driving flats for turning the driven member under predetermined torque and which will override the flats and expand the driving member under excess torque, said driven member having releasing areas for receiving the rollers after they have passed from the driving flats, a cage for the driving rollers, and means coacting with the cage and driven member for holding them in predetermined positions after the rollers have overridden said flats.

4. A torque driver consisting of an integrally formed distortable driving shell of the character described, means for coupling the shell to a machine spindle, a driven member mounted in the driving shell and having longitudinal driving cams, a cage between the driving shell and driven member, rollers mounted in the cage and coacting with the driving member and the driven member whereby the driven member is driven by the wedge action of the rollers between the shell and the cams on the driven member, the driving torque being controlled by the angle of the driving cams and the resilience of the driving shell, said driven member being completely released when the rollers ride over the driving cams, said driven member having areas for receiving the driving rollers in free position whereby the driving member may continue to rotate without exerting torque on the driven member, longitudinal slots of the cage, balls mounted in said slots, a ball track on the driven member which coacts with the balls to retain the proper relation of the rollers and driven cams after the rollers have been released, said driven member also having reversing cams which coact with the rollers for reversing the turning of the driven member, the balls and groove means serving to move the cage into positive drive position for such reverse movement when the spindle is reversed.

5. In a safety torque driver, the combination of a metallic integral elastic cylindrical driving member, means for attaching the member to a machine tool, a driven member rotatably mounted in the driving member, said driven member having driving cams or flats arranged at 180° apart, the sides of which are elevated with respect to the adjacent surfaces and rollers interposed between the driving member and the driven member which serve to drive the driven member when they are positioned on the flats but which may over-ride the elevated surfaces at the sides of the flats and consequently stretch the driving member outwardly adjacent to said rollers under excessive torque a sufficient amount to relieve the turning movement on the driven member but not beyond the elastic limit of the driving member, a cage positioned between the driving and driven members for spacing said rollers, a circumferential groove in the driven member having lateral branches, oppositely disposed longitudinal grooves in the cage and balls mounted in said longitudinal grooves and coacting with the grooves in the driven member for controlling the position of the cage with respect to said driven member.

6. A device as per claim 5 in which the groove in the driven member comprises a substantially circumferential portion with substantially circumferential branches leading therefrom for the purposes set forth.

7. A safety torque driver for taps or the like, including a driving shell formed of a single piece, means for attaching the driving shell to a machine for turning the same, a substantially cylindrical driven member mounted in the driving member and provided with driving areas and releasing areas, rollers mounted between the shell and the driven member which coact with said members for driving the driven member when in engagement with the driving areas and releasing the driven member when positioned in the releasing areas, a cage for said rollers positioned between the driving and the driven members with a clearance between it and the driving member, and a resilient ring around the cage which engages with the driving member and tends to move the cage to move the rollers out of fully released positions, into driving positions.

8. In a safety torque driver, the combination of a shank having a cylindrical recess therein, a cylindrical shell carried by the shank and formed of a single piece of resilient material and adapted to be deformed and to return to normal configuration, a driven member, bearings for supporting the driven member in the driving member including a projection at one end of the driven member, a plunger mounted in the recess in the shank, a spring interposed between the plunger and the bottom of the recess, a ball mounted between the plunger and the projection, driving flats on the driven member and rollers between the driving member and the driven member adapted to engage with said flats for driving the driven member, said driven member also having longitudinal releasing areas whereby the rollers may be positioned therein without turning the driven member.

References Cited in the file of this patent

UNITED STATES PATENTS

| | | |
|---|---|---|
| 913,475 | Dryden | Feb. 23, 1909 |
| 1,325,464 | Decker | Dec. 16, 1919 |
| 2,065,244 | Richards | Dec. 22, 1936 |
| 2,566,183 | Forss | Aug. 28, 1951 |